United States Patent [19]
Ueyama et al.

[11] Patent Number: 5,736,802
[45] Date of Patent: Apr. 7, 1998

[54] MAGNETIC BEARING DEVICE

[75] Inventors: Hirochika Ueyama, Osaka; Ryoichi Takahata, Nara, both of Japan

[73] Assignee: Koyo Seiko Co., Ltd., Osaka, Japan

[21] Appl. No.: 838,595

[22] Filed: Apr. 10, 1997

Related U.S. Application Data

[63] Continuation of Ser. No. 363,113, Dec. 23, 1994, abandoned.

[30] Foreign Application Priority Data

Dec. 24, 1993 [JP] Japan .................. 5-327661

[51] Int. Cl.$^6$ .......................... H02K 7/09
[52] U.S. Cl. ............... 310/90.5; 310/90; 318/632; 318/629
[58] Field of Search .............. 310/90.5, 90; 318/629, 318/632; 364/463

[56] References Cited

U.S. PATENT DOCUMENTS

| | | | |
|---|---|---|---|
| 4,308,490 | 12/1981 | Habermann et al. | 318/632 |
| 4,795,927 | 1/1989 | Morii et al. | 310/90.5 |
| 4,879,500 | 11/1989 | Kanemitsu | 318/632 |
| 5,142,177 | 8/1992 | Higuchi et al. | 310/90.5 |
| 5,202,824 | 4/1993 | Chen | 364/508 |
| 5,256,952 | 10/1993 | Yoneyama et al. | 318/629 |
| 5,313,399 | 5/1994 | Beale | 364/463 |
| 5,469,007 | 11/1995 | Toyama | 310/90.5 |

FOREIGN PATENT DOCUMENTS

| | | | |
|---|---|---|---|
| 0534613 | 3/1993 | European Pat. Off. | 310/90.5 |
| 0549911 | 7/1993 | European Pat. Off. | 310/90.5 |
| 2609133 | 7/1988 | France | 310/90.5 |
| 59-212519 | 12/1984 | Japan | 310/90.5 |
| 60-14619 | 1/1985 | Japan . | |
| 5-231428 | 9/1993 | Japan | 310/90.5 |

OTHER PUBLICATIONS

"Improved Notch Filter for Synchronous–Response Control", Johnson et al., NTIS Tech Notes (Aug., 1991), p. 639.

"Control of Unbalance Response with Magnetic Bearings", by C.R. Knospe et al., Proceedings of the 1992 ACC, Jun. 24, 1992.

*Primary Examiner*—Clayton E. LaBalle
*Assistant Examiner*—Elvin G. Enad
*Attorney, Agent, or Firm*—Reid & Priest LLP

[57] ABSTRACT

A magnetic bearing device comprises a radial magnetic bearing having a plurality of radial electromagnets for contactlessly supporting a rotary body radially thereof, a radial displacement detector for detecting the radial displacement of the rotary body, and a radial PID control circuit for controlling drive current for the electromagnets based on a radial displacement signal from the detector. The device further comprises a negative feedback circuit for negatively feeding back the output signal of the control circuit to the input of the control circuit via a notch filter.

9 Claims, 6 Drawing Sheets

MAGNETIC BEARING DEVICE

This is a file wrapper continuation of U.S. application No. 08/363,113, filed Dec. 23,1994, now abandoned.

BACKGROUND OF THE INVENTION

The present invention relates to magnetic bearing devices.

Controllable magnetic bearing devices are known which comprise a radial magnetic bearing having a plurality of radial electromagnets for contactlessly supporting a rotary shaft (rotary body) radially thereof, a displacement detector for detecting the radial displacement of the rotary shaft, and a PID control circuit for controlling drive current for the radial magnetic bearing based on a displacement signal from the detector.

Such a magnetic bearing device is used, for example, for the main shaft of machine tools, whereas this case involves the problem that the cutting operation vibrates the rotary shaft owing to a disturbance, rendering the magnetic bearing uncontrollable. Accordingly it is necessary to improve the bearing rigidity at the steady-state number of revolutions regardless of the natural frequency of the rotary shaft.

As disclosed, for example, in Unexamined Japanese Patent Publication SHO 60-14619, therefore, it is proposed to overcome the above problem by connecting a band-pass filter in parallel with the PID control circuit to locally effect a phase advance end also increase the gain.

However, even if the bearing rigidity is improved locally at the steady-state number of revolutions, the proposal still fails to realize an improvement since phase delay and decreased gain conversely occur before the steady-state revolution number is reached (see Unexamined Japanese Patent Publication SHO 60-14619).

SUMMARY OF THE INVENTION

An object of the present invention is to solve the foregoing problem and to provide a magnetic bearing device which is adapted for a phase advance approximately at the steady-state number of revolutions to afford improved bearing rigidity.

The present invention provides a magnetic bearing device comprising a radial magnetic bearing having a plurality of radial electromagnets for contactlessly supporting a rotary body radially thereof, a radial displacement detector for detecting the radial displacement of the rotary body, and a radial PID control circuit for controlling drive current for the radial electromagnets based on a radial displacement signal from the radial displacement detector, the magnetic bearing device being characterized in that the device comprises negative feedback means for negatively feeding back the output signal of the radial PID control circuit to the input of the PID control circuit via a notch filter.

Preferably, the feedback factor $\alpha$ expressed by the following equation is 0.09 to 0.2

$$S2=S1-\alpha \cdot S3$$

wherein S1 is the radial displacement signal from the radial displacement detector, S2 is the output signal of the radial PID control circuit and S3 is the output of the notch filter of the negative feedback means as a negative feedback signal.

The negative feedback means comprises, for example, the notch filter for receiving the output signal of the radial PID control circuit, and an operational amplifier for calculating the difference between the output signal of the radial displacement detector and the output signal of the notch filter and feeding the difference to the control circuit.

For example, the output signal of the radial displacement detector is input to a non-converting input terminal of the operational amplifier via a first resistor connected between the non-converting input terminal and the ground potential and a second resistor connected between the radial displacement detector and the non-converting input terminal, the output signal of the notch filter is input to a converting input terminal of the operational amplifier via a third resistor, and the output signal of the operational amplifier is input to the converting input terminal of the operational amplifier via a fourth resistor.

For example, the feedback factor $\alpha$ is expressed by the equation $$\alpha=R4/(R3+R4)$$

wherein R3 is the resistance value of the third resistor, and R4 is the resistance value of the fourth resistor.

The radial magnetic bearing comprises, for example, the plurality of radial electromagnets for contactlessly supporting the rotary body radially thereof, and a power amplifier for controlling the drive current for the radial electromagnets based on the output signal of the radial PID control circuit.

The radial displacement detector comprises, for example, a plurality of radial position sensors for detecting the radial position of the rotary body, and a radial displacement calculating circuit for calculating the radial displacement of the rotary body from the outputs of the radial position sensors.

The device comprises, for example, an axial bearing for supporting the rotary body axially thereof.

The device comprises, for example, an axial magnetic bearing having a plurality of axial electromagnets for contactlessly supporting the rotary body axially thereof, an axial displacement detector for detecting the axial displacement of the rotary body, and an axial PID control circuit for controlling drive current for the axial electromagnets based on an axial displacement signal from the axial displacement detector.

The output signal of the radial PID control circuit is negatively fed back to the input of the control circuit by way of the notch filter, so that the phase can be advanced approximately at the constant-state number of revolutions to give improved bearing rigidity. The device is therefore usable, for example, for the main shaft of a machine tool free of the problem that the magnetic hearing becomes uncontrollable owing to vibration.

The feedback factor $\alpha$, if in the range of 0.09 to 0.2, permits a phase advance around the steady-state number of revolutions, enhances the bearing rigidity and yet obviates the likelihood that excessively great gain will result in vibration around the steady-state revolution number.

Figures 6A, 6B:
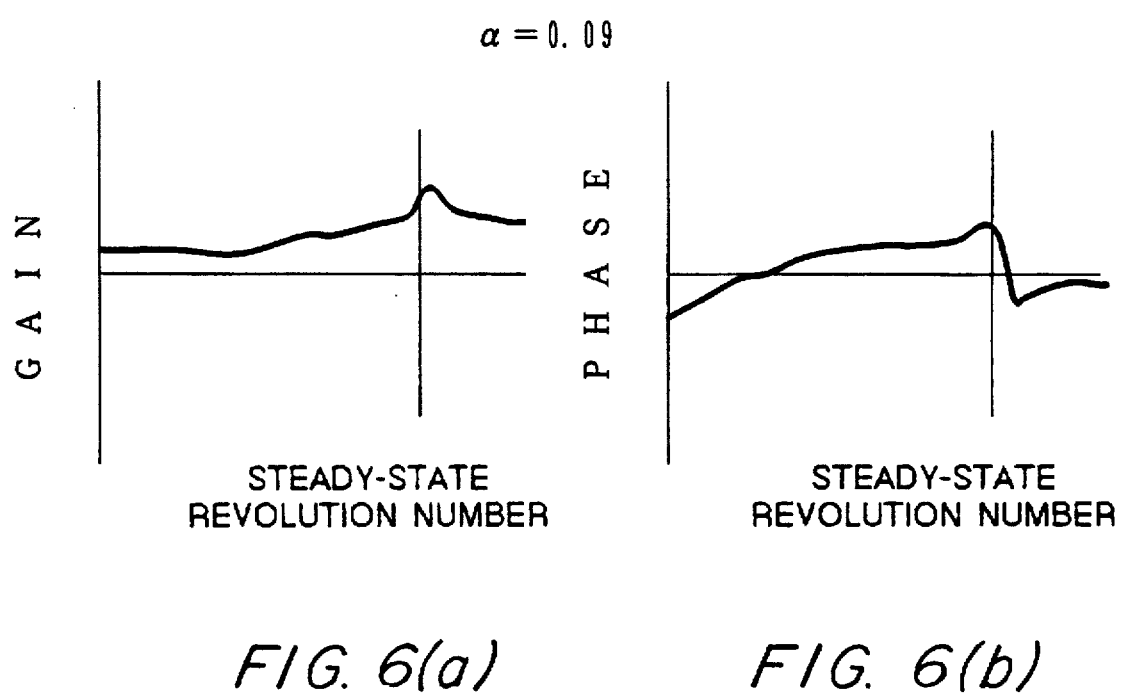

For brevity, pairs of drawings such as FIGS. 6(a) and 6(b) may be collectively referred to as FIG. 6.

DESCRIPTION OF THE PREFERRED EMBODIMENT

An embodiment of the present invention will be described below with reference to the drawings.

Figure 1:
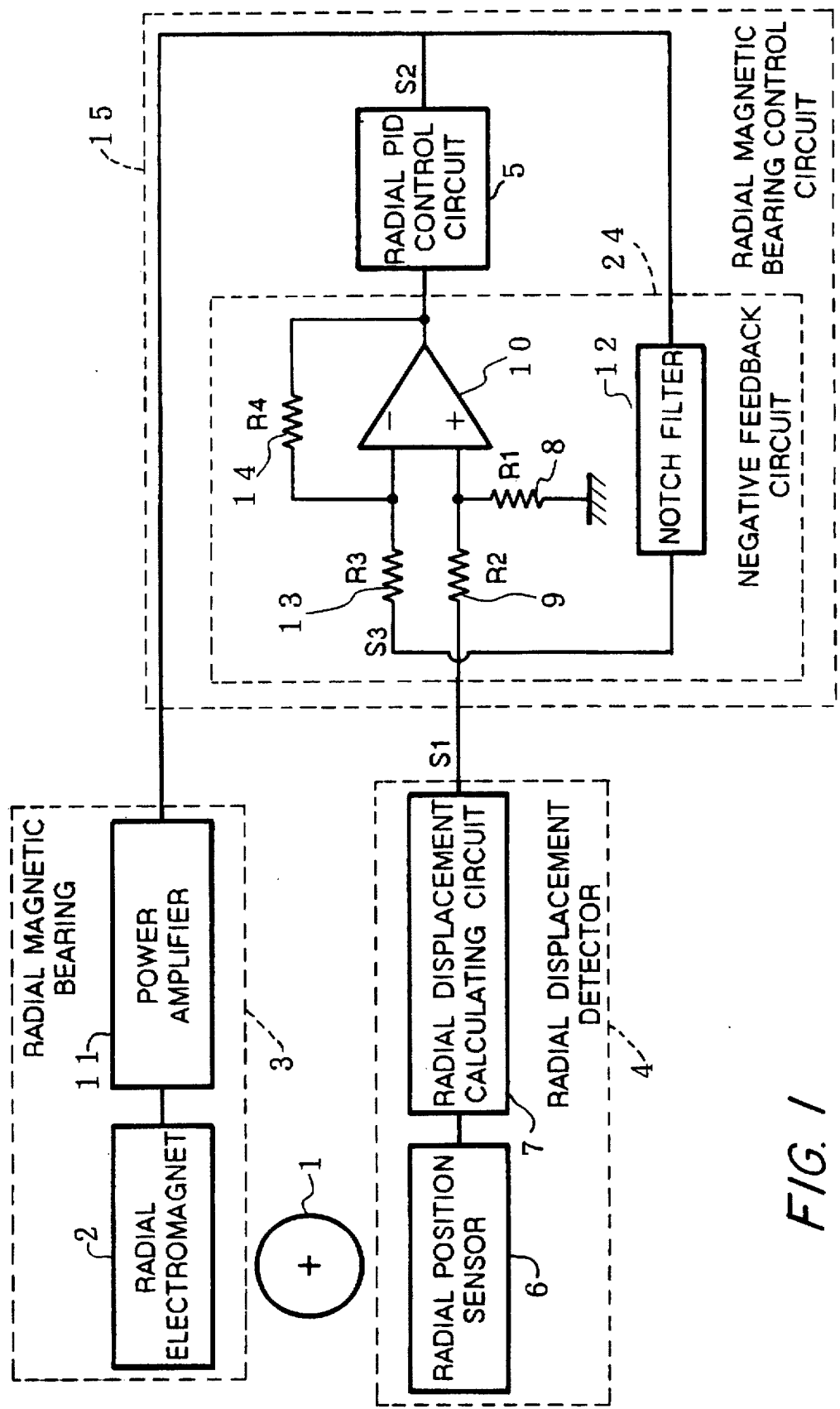
FIG. 1 is a block diagram of the main portion of a magnetic bearing device embodying the invention.
Figure 2:
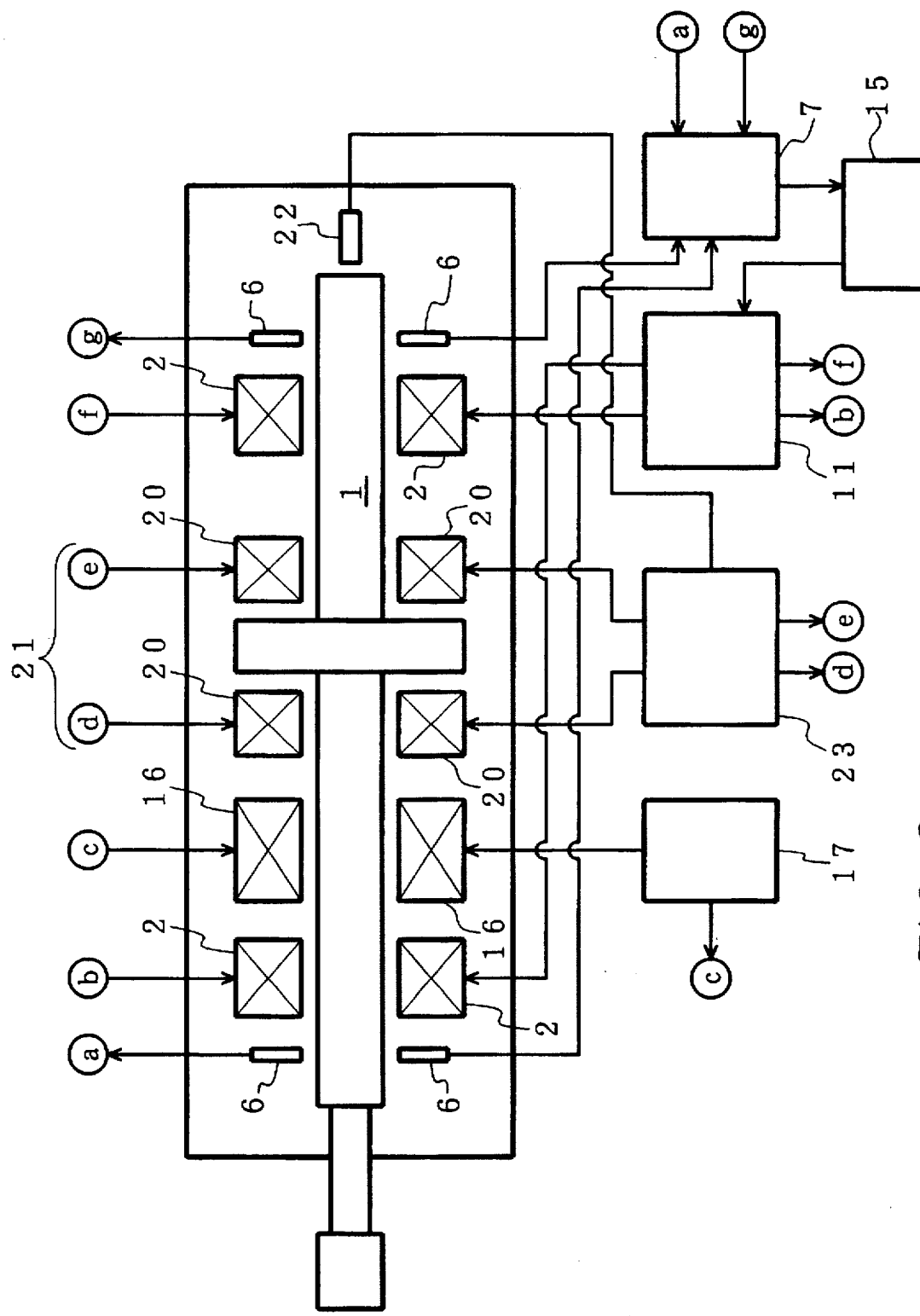
FIG. 2 is a schematic diagram showing the construction of the magnetic bearing device.

FIG. 1 shows an example of electrical construction of the main portion of a magnetic bearing device, and FIG. 2 schematically shows an example of overall construction of the device.

With reference to FIG. 1, the magnetic bearing device comprises a radial magnetic bearing 3 having a plurality of radial electromagnets 2 for contactlessly supporting a rotary shaft (rotary body) 1 radially thereof, a radial displacement detector 4 for detecting the radial displacement of the rotary shaft 1, and a radial magnetic bearing control circuit 15 having a radial PID control circuit 5 for controlling drive current for the electromagnets 2 based on a radial displacement signal S1 from the displacement detector 4. The detector 4 comprises a plurality of radial position sensors 6 for detecting the radial position of the rotary shaft 1, and a radial displacement calculating circuit 7 for determining the radial displacement of the rotary shaft 1 from the outputs of these sensors 6. The bearing device has radial magnetic bearings 3, radial electromagnets 2 constituting the bearing, and radial position sensors 6 of the radial displacement detector 4 which are each more than one in number, whereas FIG. 1 shows only one of each of these components. As shown in FIG. 2, the bearing device further comprises an axial magnetic bearing 21 having two axial electromagnets 20 for contactlessly supporting the rotary shaft 1 axially thereof, an axial displacement detector 22 for detecting the axial displacement of the rotary shaft 1, and an axial magnetic bearing control circuit 23 having an axial PID control circuit for controlling drive current for the axial electromagnets 20 based on an axial displacement signal from the detector 22. The bearing device has connected thereto a motor 16 for rotating the rotary shaft 1, and a motor control circuit 17 for controlling the motor 16.

The radial magnetic bearing control circuit 15 comprises a negative feedback circuit 24 providing negative feedback means. The circuit 24 comprises a notch filter 12, an operational amplifier 10 and first to fourth resistors 8, 9, 13 and 14.

The radial displacement signal S1 from the radial displacement detector 4 is input to a non-converting input terminal of the operational amplifier 10 via the first resistor 8 (resistance value R1) connected between the non-converting input terminal of the amplifier 10 and the ground potential and the second resistor 9 (resistance value R2) connected between the detector 4 and the non-converting input terminal of the amplifier 10. The amplifier feeds an output signal to the radial PID control circuit 5, which in turn delivers an output signal S2 to the power amplifier 11 of the radial magnetic bearing 3. The amplifier 11 controls the drive current for the radial electromagnets 2 based on the signal S2. The output signal S2 of the PID control circuit 5 is fed also to the notch filter 12, which in turn inputs an output signal, i.e., negative feedback signal S3, to a converting input terminal of the amplifier 10 via the third resistor 13 (resistance value R3). The output signal of the amplifier 10 is input to the converting input terminal of the amplifier 10 via the fourth resistor 14 (resistance value R4). The operational amplifier 10 calculates the difference between the displacement signal S1 from the detector 4 and the output signal S3 of the notch filter 12 and feeds the difference to the PID control circuit 5, whereby the output signal S2 of the control circuit 5 is negatively fed back to the input of the control circuit 5 through the notch filter 12. The output signal S2 of the PID control signal 5 is expressed by the following equation.

$$S2=S1-\alpha \cdot S3$$

wherein $\alpha$ (=R4/(R3+R4)) is a feedback factor.

Figures 7A, 7B:
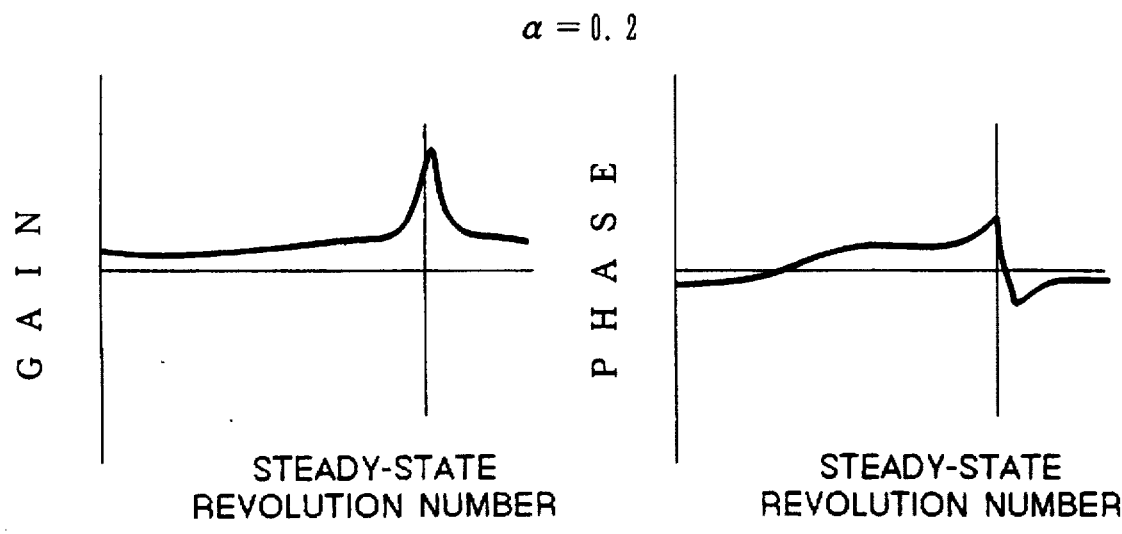

For example, FIG. 6 or 7 shows the radial frequency characteristics of the magnetic bearing device described. With this device, the output signal S2 of the radial PID control circuit 5 is negatively fed back to the input of the control circuit 5 by way of the notch filter 12. This effects a phase advance in the vicinity of the steady-state number of revolutions and results in enhanced bearing rigidity, consequently eliminating the problem that vibration renders the magnetic bearing uncontrollable when the the device is used, for example, for the main shaft of a machine tool.

Figures 3A, 3B:
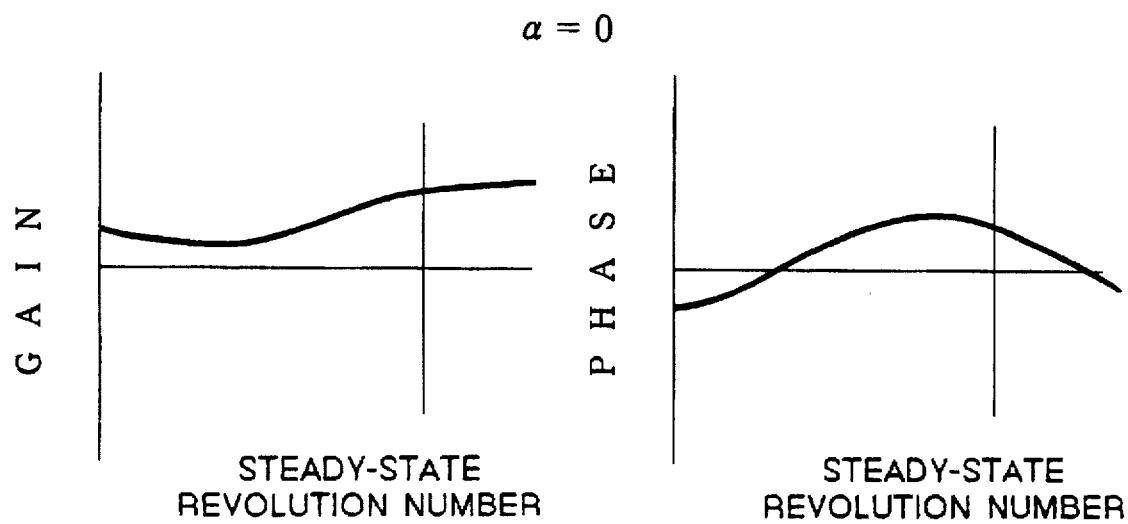
FIGS. 3(a), 3(b), 4(a), 4(b), 5(a), 5(b) 6(a), 6(b), 7(a), 7(b), 8(a), 8(b), 9(a, and 9(b) are diagrams showing examples of frequency characteristics for various feedback factors $\alpha$.
Figures 4A, 4B:
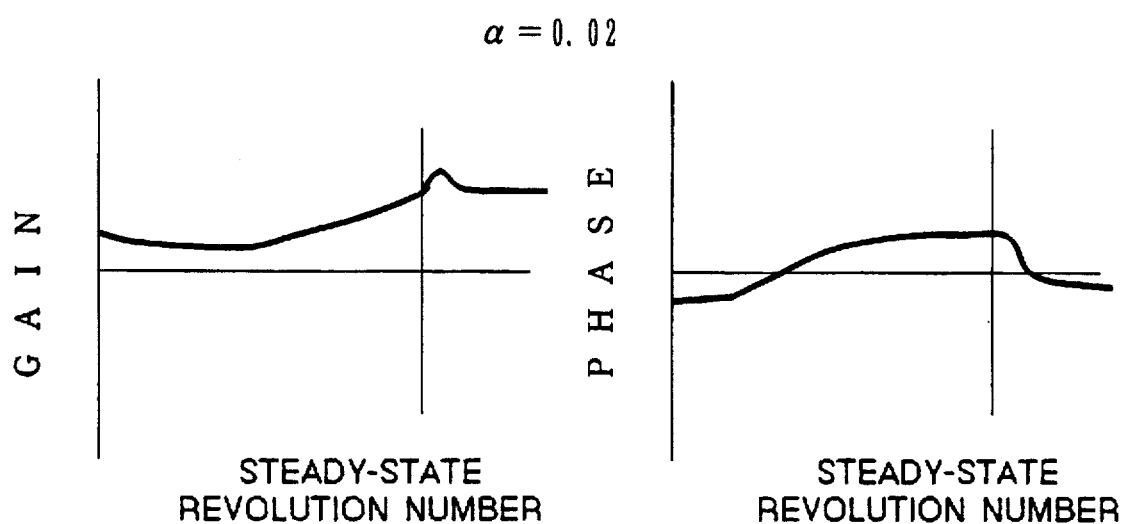
Figures 5A, 5B:
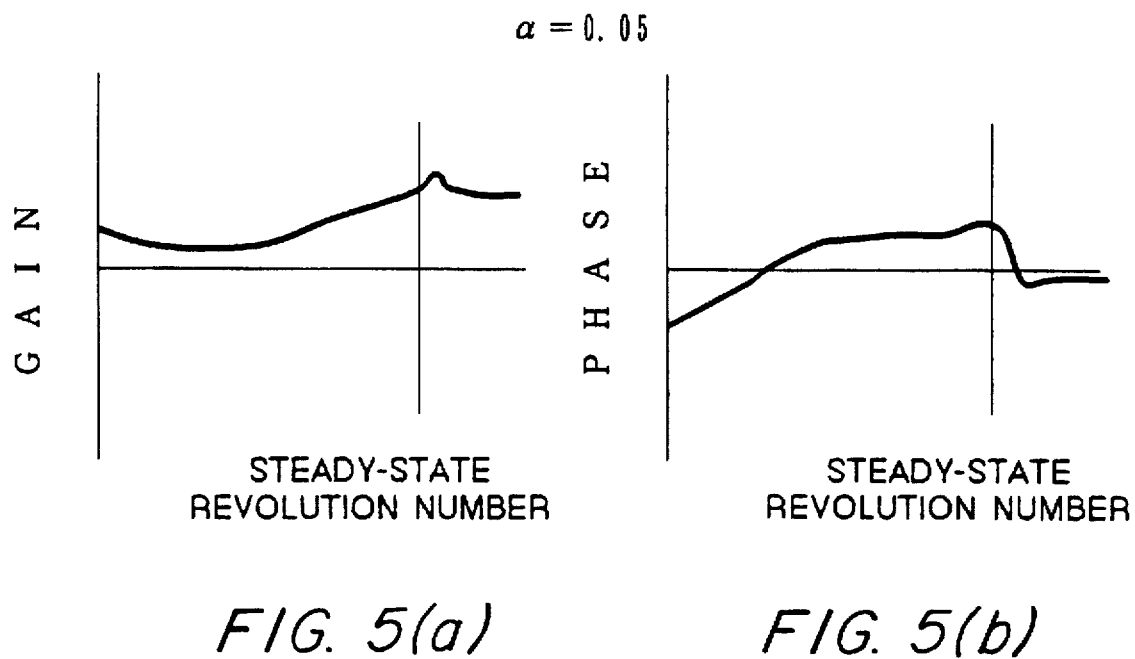
Figures 8A, 8B:
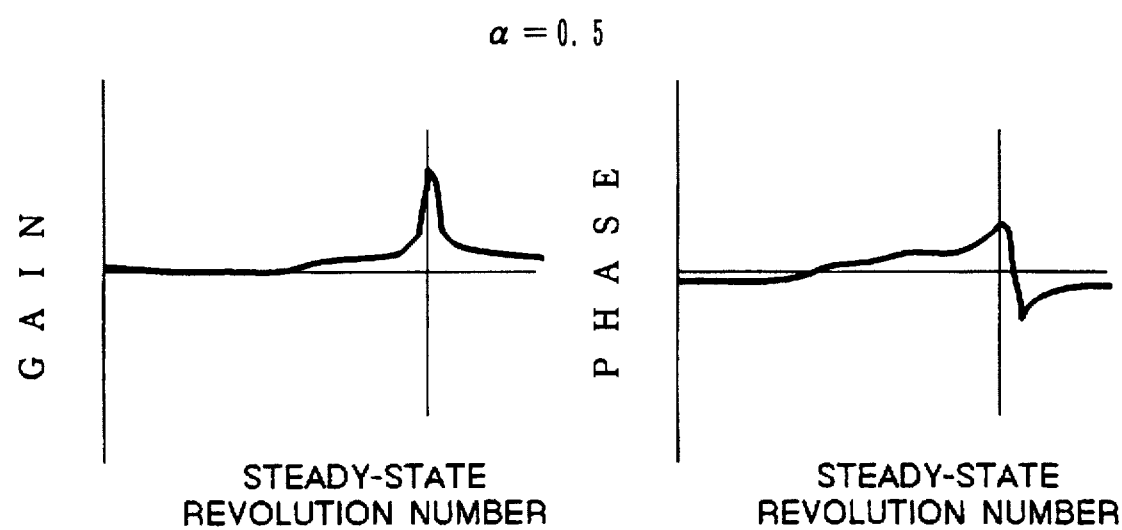
Figures 9A, 9B:
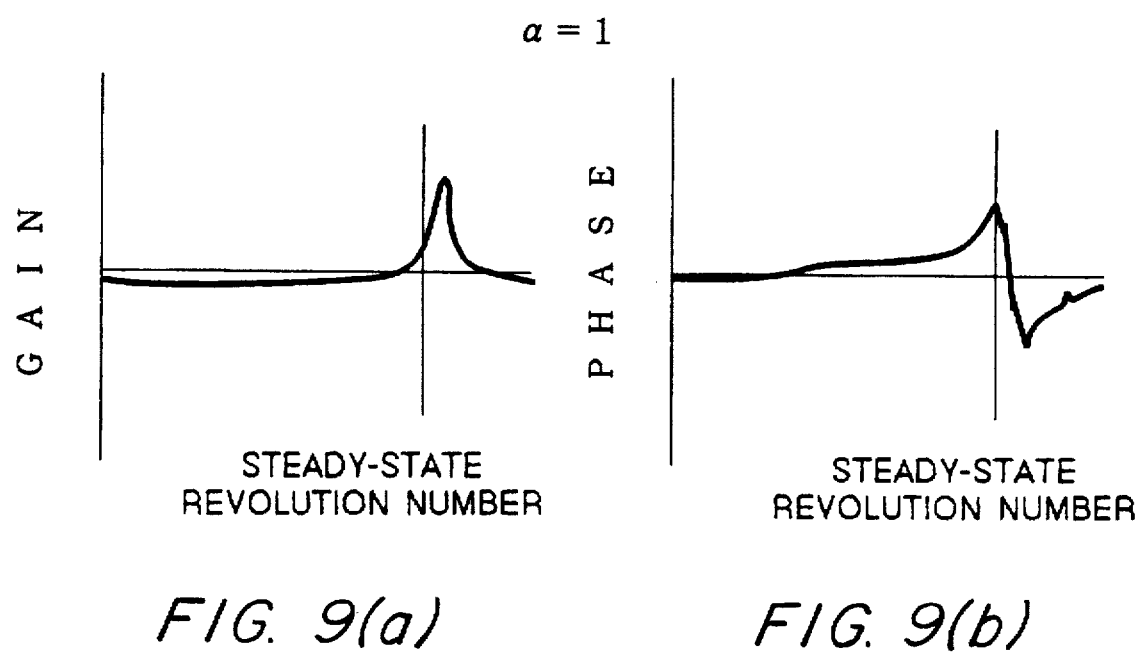

It is suitable that the feedback factor $\alpha$ be about 0.09 to about 0.2. The feedback factor $\alpha$, if smaller than 0.09, leads to phase delay, whereas if the factor $\alpha$ is greater than 0.2, increased gain and susceptibility to vibration will result. This is substantiated also by the experimental results shown in FIGS. 3 to 9 as to the frequency characteristics at varying feedback factors $\alpha$. When $\alpha$ is 0.02 or 0.05, the phase advance is insufficient around the steady-state revolution number as shown in FIGS. 3 to 5, failing to fully improve the bearing rigidity. FIGS. 6 and 7 reveal that when $\alpha$ is 0.09 to 0.2, a phase advance occurs around the steady-state revolution number to result in improved bearing rigidity without the likelihood that excessively great gain will entail vibration around the steady-state revolution number. When $\alpha$ is 0.5, the gain increases considerably around the steady-state revolution number with a likelihood of vibration as shown in FIG. 8. If $\alpha$ increases to 1, the gain further increases around the steady-state revolution number as seen in FIG. 9 with occurrence of vibration. Incidentally, simulation give substantially the same results as above.

What is claimed is:

1. A magnetic bearing device comprising:
   a) a radial magnetic beating having a plurality of radial electromagnets for contactlessly supporting a rotary body radially thereof,
   b) a radial displacement detector for detecting the radial displacement of the rotary body,
   c) a radial PID control circuit for controlling drive current for the radial electromagnets based on a radial displacement signal from the radial displacement detector, and
   d) negative feedback means for negatively feeding back an output signal of the radial PID control circuit to an input of the radial PID control circuit via a notch filter, the negative feedback means constituting:
      d') means for improving damping of the bearing by providing a phase advance that is approximately at a frequency that corresponds to a steady-state number of revolutions per unit time.

2. A magnetic bearing device as defined in claim 1 which is characterized by the feedback factor $\alpha$ expressed by the equation $$S2=S1-\alpha \cdot S3$$

wherein S1 is the radial displacement signal from the radial displacement detector, S2 is the output signal of the radial PID control circuit and S3 is the output of the notch filter of the negative feedback means as a negative feedback signal, the feedback factor $\alpha$ being 0.09 to 0.2.

3. A magnetic bearing device as defined in claim 1 which is characterized in that the negative feedback means comprises the notch filter for receiving the output signal of the radial PID control circuit, and an operational amplifier for calculating the difference between the output signal of the radial displacement detector and the output signal of the notch filter and feeding the difference to the control circuit.

4. A magnetic bearing device as defined in claim 3 which is characterized in that the output signal of the radial displacement detector is input to a non-converting input terminal of the operational amplifier via a first resistor connected between the non-converting input terminal and the ground potential and a second resistor connected between the radial displacement detector and the non-converting input terminal, the output signal of the notch filter is input to a converting input terminal of the operational amplifier via a third resistor, and the output signal of the operational amplifier is input to the converting input terminal of the operational amplifier via a fourth resistor.

5. A magnetic bearing device as defined in claim 2 which is characterized in that the negative feedback means comprises the notch filter for receiving the output signal of the radial PID control circuit, and an operational amplifier for calculating the difference between the output signal of the radial displacement detector and the output signal of the notch filter and feeding the difference to the control circuit, the output signal of the radial displacement detector is input to a non-converting input terminal of the operational amplifier via a first resistor connected between the non-converting input terminal and the ground potential and a second resistor connected between the radial displacement detector and the non-converting input terminal, the output signal of the notch filter is input to a converting input terminal of the operational amplifier via a third resistor, and the output signal of the operational amplifier is input to the converting input terminal of the operational amplifier via a fourth resistor, the negative feedback means having a feedback factor $\alpha$ expressed by the equation $$\alpha = R4/(R3+R4)$$

wherein R3 is the resistance value of the third resistor, and R4 is the resistance value of the fourth resistor.

6. A magnetic bearing device as defined in claim 1 which is characterized in that the radial magnetic bearing comprises the plurality of radial electromagnets for contactlessly supporting the rotary body radially thereof, and a power amplifier for controlling the drive current for the radial electromagnets based on the output signal of the radial PID control circuit.

7. A magnetic bearing device as defined in claim 1 which is characterized in that the radial displacement detector comprises a plurality of radial position sensors for detecting the radial position of the rotary body, and a radial displacement calculating circuit for calculating the radial displacement of the rotary body from the outputs of the radial position sensors.

8. A magnetic bearing device as defined in claim 1 which is characterized in that the device comprises an axial bearing for supporting the rotary body axially thereof.

9. A magnetic bearing device as defined in claim 1 which is characterized in that the device comprises an axial magnetic bearing having a plurality of axial electromagnets for contactlessly supporting the rotary body axially thereof, an axial displacement detector for detecting the axial displacement of the rotary body, and an axial PID control circuit for controlling drive current for the axial electromagnets.

* * * * *